(12) United States Patent
Jacobsen et al.

(10) Patent No.: US 7,881,044 B2
(45) Date of Patent: Feb. 1, 2011

(54) ELECTRICAL SWITCHING APPARATUS AND DAMPENING MECHANISM THEREFOR

(75) Inventors: Mark William Jacobsen, Spartanburg, SC (US); Judith Robin Prince, Edgefield, SC (US); Barry Tuck Rambo, Bradley, SC (US)

(73) Assignee: Eaton Corporation, Cleveland, OH (US)

( * ) Notice: Subject to any disclaimer, the term of this patent is extended or adjusted under 35 U.S.C. 154(b) by 85 days.

(21) Appl. No.: 12/477,956

(22) Filed: Jun. 4, 2009

(65) Prior Publication Data

US 2010/0309609 A1 Dec. 9, 2010

(51) Int. Cl.
*H01H 9/20* (2006.01)
*H01H 9/22* (2006.01)
*H02B 5/00* (2006.01)

(52) U.S. Cl. ............ 361/608; 361/605; 361/606; 361/609; 200/50.17; 200/50.21; 200/50.24; 200/50.26; 200/240; 200/605

(58) Field of Classification Search ......... 361/600–610, 361/614–624, 627, 636, 652, 656; 200/50 AA, 200/50.01–50.32, 85 B, 240, 241, 605–610, 200/615
See application file for complete search history.

(56) References Cited

U.S. PATENT DOCUMENTS

| | | | | |
|---|---|---|---|---|
| 2,273,001 A | * | 2/1942 | Mahoney | 361/609 |
| 2,673,260 A | * | 3/1954 | Lester et al. | 200/50.26 |
| 3,219,771 A | * | 11/1965 | Umphrey | 200/50.25 |
| 3,288,956 A | | 11/1966 | Jencks et al. | |
| 3,440,371 A | | 4/1969 | Netzel et al. | |
| 3,474,201 A | | 10/1969 | Bould | |
| 3,578,925 A | * | 5/1971 | Drown et al. | 200/50.24 |
| 3,588,398 A | * | 6/1971 | Siviy | 200/50.26 |
| 3,710,044 A | * | 1/1973 | Sharp | 200/50.25 |
| 3,767,874 A | * | 10/1973 | Wilson | 200/50.26 |
| 3,783,208 A | * | 1/1974 | Davies et al. | 200/50.22 |
| 3,783,209 A | * | 1/1974 | Cleaveland et al. | 200/50.25 |
| 4,002,864 A | | 1/1977 | Kuhn et al. | |
| 4,002,865 A | | 1/1977 | Kuhn et al. | |
| 4,017,698 A | | 4/1977 | Kuhn et al. | |
| 4,265,583 A | * | 5/1981 | Baird et al. | 414/284 |
| 4,281,227 A | * | 7/1981 | Rexroad et al. | 200/50.21 |
| 5,278,722 A | * | 1/1994 | Peruso | 361/606 |
| 7,019,229 B1 | | 3/2006 | Weister et al. | |
| 7,486,499 B2 | | 2/2009 | Rambo et al. | |

* cited by examiner

*Primary Examiner*—Michael V Datskovskiy
(74) *Attorney, Agent, or Firm*—Martin J. Moran

(57) ABSTRACT

A dampening mechanism for an electrical for an electrical switching apparatus, such as a draw-out circuit breaker, includes a mounting bracket coupled to the circuit breaker, a pivot member, at least one biasing element, and a damper. The circuit breaker is movable into and out of an installed position within a switchgear enclosure. The pivot member pivots between first and second positions corresponding to the circuit breaker not being fully installed and being disposed in the installed position, respectively. The biasing element biases the pivot member toward the first position. When the circuit breaker is moved toward the installed position, the second end of the pivot member engages at least one of a back panel and a ledge of the enclosure, thereby pivoting the pivot member toward the second position. When the pivot member is disposed in the second position, the damper is biased against the ledge of the enclosure to dampen undesired vertical motion of the circuit breaker.

20 Claims, 3 Drawing Sheets

US 7,881,044 B2

ELECTRICAL SWITCHING APPARATUS AND DAMPENING MECHANISM THEREFOR

BACKGROUND

1. Field

The disclosed concept relates generally to electrical switching apparatus and, more particularly, to dampening mechanisms for electrical switching apparatus, such as draw-out circuit breakers.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of cells, with each cell being structured to receive a corresponding circuit breaker. The draw-out mechanism includes, for example, a combination of rails and rollers coupled to one or the other, or both, of the sidewalls of the cell and the sides of the corresponding circuit breaker, which is to be drawn into and out of the cell. Draw-out circuit breakers are described in further detail, for example, in commonly assigned U.S. Pat. No. 7,019,229, which is hereby incorporated herein by reference.

Under certain circumstances such as, for example, when the circuit breaker trips in response to an electrical fault condition (e.g., without limitation, a current overload; a short circuit; an abnormal voltage or some other fault condition), the circuit breaker may be subjected to relatively large magnetic repulsion forces. Such forces have a tendency to induce impulse type motion resulting in undesirable vertical movement of the circuit breaker within the cell of the switchgear enclosure.

One prior proposal for resisting such movement includes an arrangement of manually adjusted hardware such as, for example, a plurality of bolts which are tightened or loosened until they suitably engage a corresponding feature (e.g., without limitation, a bracket; a shelf; a ledge; a protrusion) of the switchgear enclosure. Another prior proposal which is disclosed in commonly assigned U.S. Pat. No. 7,486,499, which is incorporated herein by reference, incorporates a securing mechanism having a conglomeration of movable engagement members (e.g., steel bars) and springs mounted to the circuit breaker and designed to automatically adjust and securely engage the switchgear enclosure as the circuit breaker is moved into the fully installed position. However, each of the foregoing approaches suffers from its own unique set of disadvantages.

There is, therefore, room for improvement in electrical switching apparatus, such as circuit breakers, and in dampening mechanisms therefor.

SUMMARY

These needs and others are met by embodiments of the disclosed concept, which are directed to a dampening mechanism for electrical switching apparatus, such as circuit breakers. Among other benefits, the dampening mechanism dampens undesired vertical motion of the circuit breaker within a cell of a switchgear enclosure.

As one aspect of the disclosed concept, a dampening mechanism is provided for an electrical switching apparatus which is movable into and out of an installed position within a switchgear enclosure. The switchgear enclosure includes a back panel and a ledge extending outwardly from the back panel. The dampening mechanism comprises: a mounting bracket structured to be coupled to the electrical switching apparatus; a pivot member comprising a first end pivotably coupled to the mounting bracket and a second end disposed opposite and distal from the first end, the pivot member being structured to pivot between a first position corresponding to the electrical switching apparatus not being fully installed within the switchgear enclosure, and a second position corresponding to the electrical switching apparatus being disposed in the installed position; at least one biasing element structured to bias the pivot member toward the first position; and a damper movably coupled to the pivot member. When the electrical switching apparatus is moved toward the installed position, the second end of the pivot member is structured to engage at least one of the back panel and the ledge of the switchgear enclosure, thereby pivoting the pivot member toward the second position. When the pivot member is disposed in the second position, the damper is structured to be biased against the ledge of the switchgear enclosure to dampen undesired vertical motion of the electrical switching apparatus with respect to the switchgear enclosure.

As another aspect of the disclosed concept, a draw-out electrical switching apparatus is provided, which is movable into and out of an installed position within a switchgear enclosure. The switchgear enclosure comprises a back panel and a ledge extending outwardly from the back panel. The draw-out electrical switching apparatus comprises: a housing; separable contacts; an operating mechanism structured to open and close the separable contacts; and at least one dampening mechanism comprising: a mounting bracket structured to be coupled to the electrical switching apparatus, a pivot member comprising a first end pivotably coupled to the mounting bracket and a second end disposed opposite and distal from the first end, the pivot member being structured to pivot between a first position corresponding to the electrical switching apparatus not being fully installed within the switchgear enclosure, and a second position corresponding to the electrical switching apparatus being disposed in the installed position, at least one biasing element biasing the pivot member toward the first position, and a damper movably coupled to the pivot member. When the electrical switching apparatus is moved toward the installed position, the second end of the pivot member is structured to engage at least one of the back panel and the ledge of the switchgear enclosure, thereby pivoting the pivot member toward the second position. When the pivot member is disposed in the second position, the damper is structured to be biased against the ledge of the switchgear enclosure to dampen undesired vertical motion of the electrical switching apparatus with respect to the switchgear enclosure.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
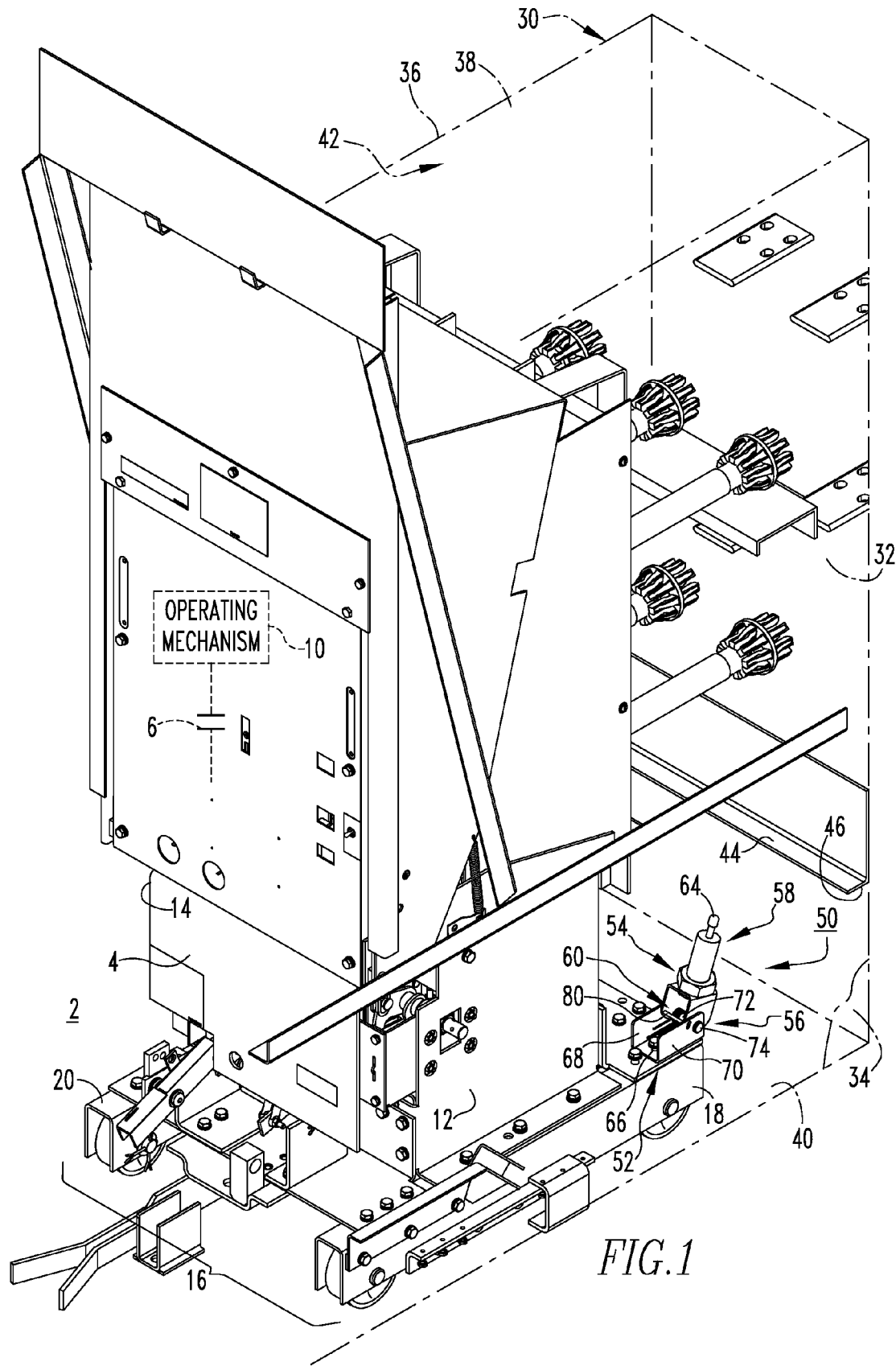
FIG. 1 is an isometric view of a draw-out circuit breaker, shown partially withdrawn from a cell of a switchgear enclosure, and a dampening mechanism therefor, in accordance with an embodiment of the disclosed concept.

For purposes of illustration, embodiments of the invention will be described as applied to medium-voltage circuit breakers, although it will become apparent that they could also be applied to a wide variety of electrical switching apparatus (e.g., without limitation, circuit switching devices and other circuit interrupters, such as contactors, motor starters, motor controllers and other load controllers) other than medium-voltage circuit breakers and other than medium-voltage electrical switching apparatus.

Directional phrases used herein, such as, for example, left, right, clockwise, counterclockwise, up, down and derivatives thereof, relate to the orientation of the elements shown in the drawings and are not limiting upon the claims unless expressly recited therein.

As employed herein, the term "self-adjusting" refers to the ability of the disclosed dampening mechanism to move (e.g., without limitation, pivot; rotate) itself and/or the electrical switching apparatus with respect to the cell of the switchgear enclosure in which the electrical switching apparatus is being inserted, as the electrical switching apparatus is being inserted, in order to move into the correct position and provide the desired dampening force (e.g., without limitation, absorption of and/or resistance to vertical movement) of the electrical switching apparatus with respect to the cell. In other words, the disclosed dampening mechanism automatically cooperates with the cell in the desired manner, without requiring any separate tools (e.g., without limitation, wrenches; screwdrivers; rulers; tape measures) or separate operations (e.g., measurement of the cell; adjustment of the draw-out mechanism and/or the circuit breaker to fit securely within the cell).

As employed herein, the term "ledge" refers to any suitable protrusion (e.g., without limitation, flange; tab; shelf; bracket or other suitable projection) against which the disclosed dampening mechanism can be biased to dampen undesired forces and associated movement (e.g., without limitation, vertical motion) of the circuit breaker to which the dampening mechanism is coupled.

As employed herein, the statement that two or more parts are "coupled" together shall mean that the parts are joined together either directly or joined through one or more intermediate parts.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the term "number" shall mean one or an integer greater than one (i.e., a plurality).

FIG. 1 shows a dampening mechanism 50 for an electrical switching apparatus such as, for example, a medium-voltage draw-out circuit breaker 2, which is movable into and out of an installed position (FIG. 2) within a switchgear enclosure 30 (partially shown). The switchgear enclosure 30 includes a back panel 32 and a plurality of walls 34,36,38,40 extending outwardly from the back panel 32 to form a cell 42. Each cell 42 (one is shown) of the switchgear enclosure 30 receives a corresponding circuit breaker 2. The back panel 32 of the cell 42 includes a protrusion such as, for example and without limitation, the ledge 44 shown in FIGS. 1 and 2, which is engaged by the dampening mechanism 50 as the circuit breaker 2 is moved into the installed position (FIG. 2) within the cell 42. In the example of FIG. 1, the draw-out circuit breaker 2 is shown partially inserted within the cell 42, prior to being inserted into the installed position of FIG. 2. It will be appreciated that the switchgear enclosure 30 may include any suitable number and/or configuration of cells (e.g., 42), for example, for receiving a corresponding number and/or configuration of circuit breakers (e.g., 2) or other suitable electrical switching apparatus (not shown).

Figure 2:
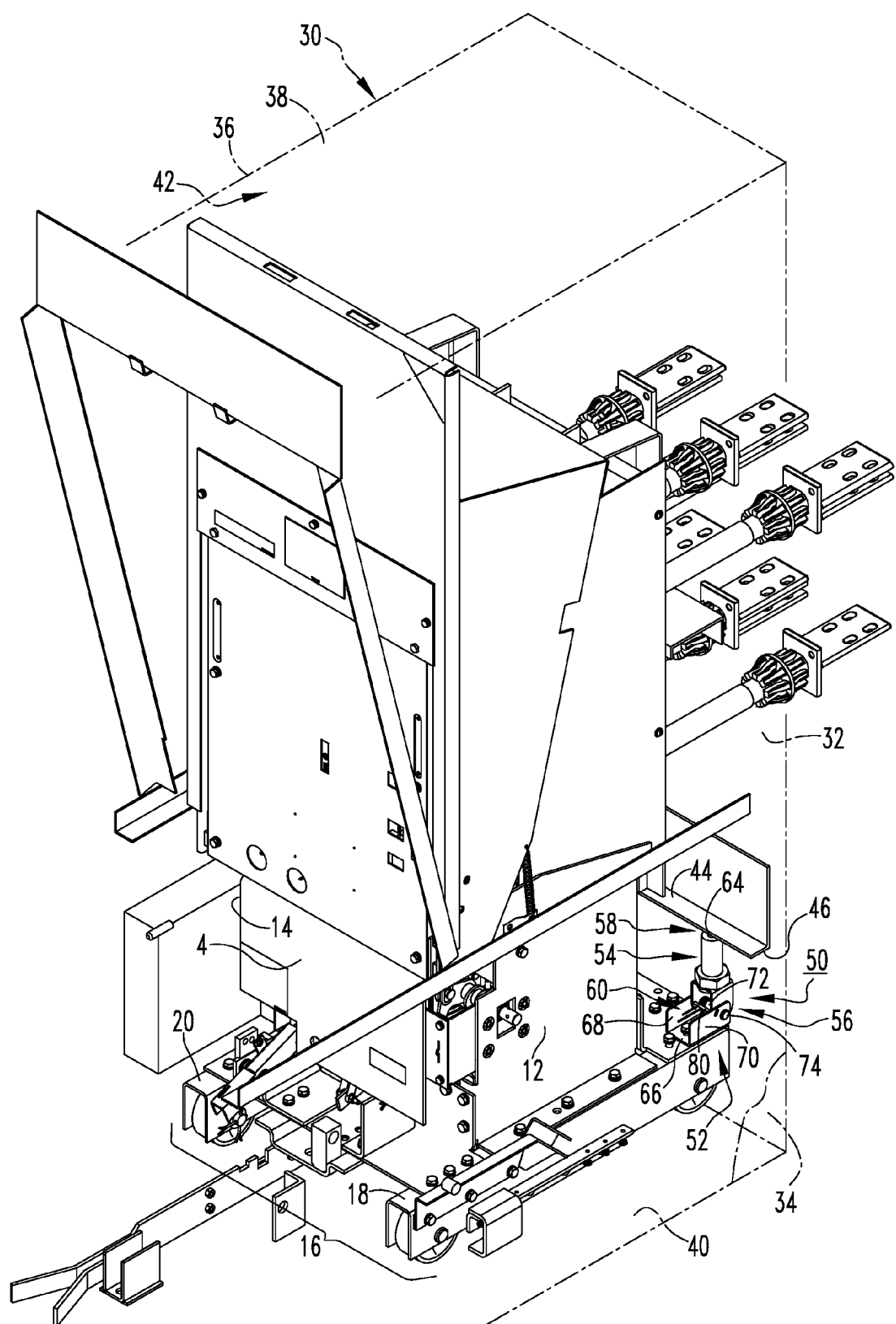
FIG. 2 is an isometric view of the draw-out circuit breaker and dampening mechanism therefor of FIG. 1, modified to show the draw-out circuit breaker fully inserted into the switchgear enclosure cell with the dampening mechanism engaging a ledge of the switchgear enclosure cell.

The example circuit breaker 2 includes a housing 4, separable contacts 6 (shown in simplified form in hidden line drawing in FIG. 1) and an operating mechanism 10 (shown in simplified form in hidden line drawing in FIG. 1) structured to open and close the separable contacts 6. As shown in FIGS. 1 and 2, the circuit breaker housing 4 includes first and second sides 12,14 and a draw-out mechanism 16. The draw-out mechanism 16 of the example draw-out circuit breaker 2 includes a first rail 18 disposed on the first side 12 of the circuit breaker housing 4, and a second rail 20 (partially shown in FIGS. 1 and 2) disposed on the second side 14 of the circuit breaker housing 4. It will be appreciated that the circuit breaker 2 may have only one dampening mechanism 50 coupled to a corresponding one of the first and second rails 18,20 (see, for example, dampening mechanism 50 coupled to the first rail 18 in the example of FIGS. 1 and 2), as shown, or a second dampening mechanism (not shown, but which is substantially identical to the dampening mechanism 50), could be optionally coupled to the second rail 20 of the draw-out mechanism 16. For economy of disclosure, only one dampening mechanism 50 will be described, in detail, herein.

Continuing to refer to FIGS. 1 and 2, the dampening mechanism 50 includes a mounting bracket 52 coupled to the circuit breaker 2 and, in particular, the corresponding rail 18 thereof. A pivot member 54 of the dampening mechanism 50 includes a first end 56 pivotably coupled to the mounting bracket 52 and a second end 58 disposed opposite and distal from the first end 56. The pivot member 54 is structured to pivot between the first position of FIG. 1 (also shown in phantom line drawing in FIG. 3), corresponding to the circuit breaker 2 not being fully installed within the switchgear enclosure 30, and the second position of FIG. 2, corresponding to the circuit breaker 2 being disposed in the installed position.

Figure 3:
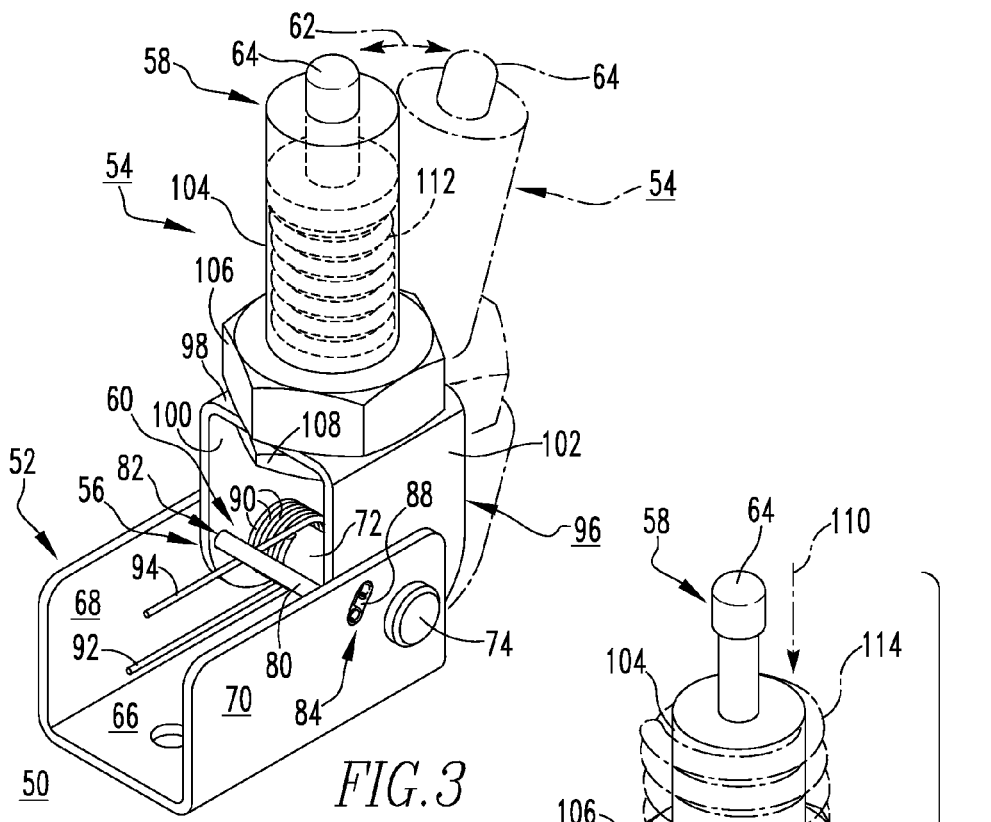
FIG. 3 is an isometric view of the dampening mechanism of FIG. 1, showing the dampening mechanism in a first position in phantom line drawing and in a second position in solid line drawing.

The dampening mechanism 50 further includes at least one biasing element 60 (FIGS. 1-4), 60' (FIG. 4), which biases the pivot member 54 toward the first position of FIG. 1 (also shown in phantom line drawing in FIG. 3). A damper such as, for example and without limitation, the plunger 64 shown and described herein, is movably coupled to the pivot member 54 at or about the second end 58 thereof, and is structured to engage and be biased against the underside 46 of the ledge 44 of the switchgear enclosure 30 when the pivot member 54 is disposed in the second position of FIG. 2. In this manner, the dampening mechanism 50 and, in particular, the damper 64 thereof, resists (e.g., without limitation, dampens) undesired vertical motion of the circuit breaker 2 with respect to the switchgear enclosure 30.

Figure 4:
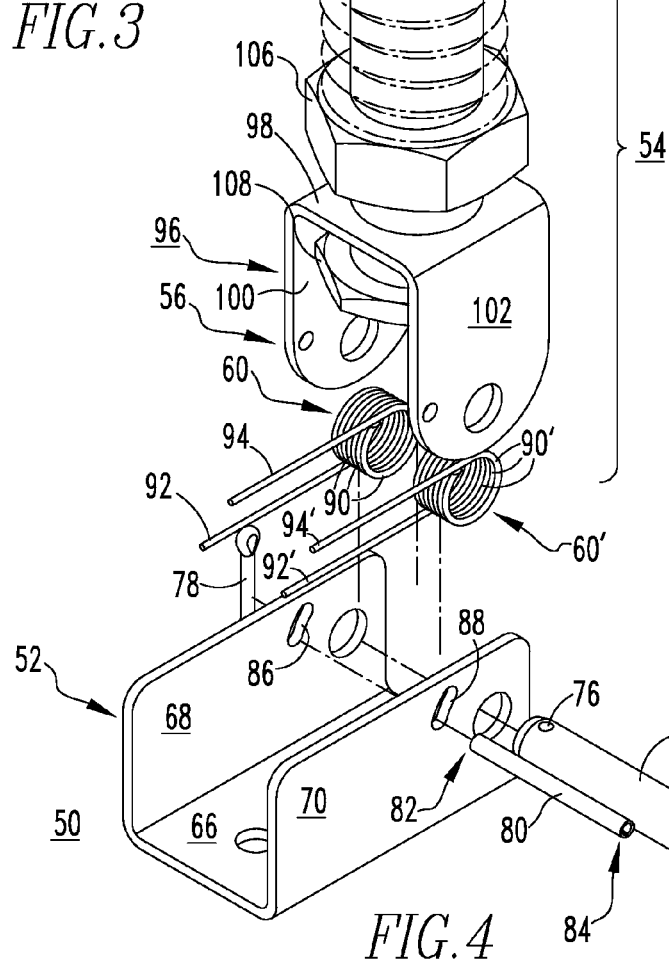
FIG. 4 is an exploded isometric view of the dampening mechanism of FIG. 1.

As shown in FIGS. 3 and 4, the example mounting bracket 52 includes a base 66 and opposing first and second sidewalls 68,70 extending outwardly from the base 66. The first end 56 of the pivot member 54 is disposed between the sidewalls 68,70 and is pivotably secured therebetween by a pivot pin 72. Specifically, the pivot pin includes an enlarged head 74 and a hole 76. The pivot pin 72 is inserted through the first end 56 of the pivot member 54, between the first and second sidewalls 68,70, until the enlarged head 74 is disposed adjacent to the exterior of sidewall 70 and the hole 76 is disposed on the exterior of sidewall 68. A fastener such as, for example and without limitation, the cotterpin 78 partially shown in FIG. 4, is then inserted through the hole 76 of the pivot pin 72 to secure it in the assembled position.

The pivot member 54 of the dampening mechanism 50 further includes a pivot stop 80, which in the example shown and described herein is a pin member having opposing first and second ends 82,84, which are disposed in corresponding first and second slots 86,88 in the first and second mounting bracket sidewalls 68,70, respectively. The pivot stop 80 cooperates with the aforementioned biasing element(s) 60,60' (both shown in FIG. 4) to bias the pivot member 54 toward the first position (FIG. 1; also shown in phantom line drawing in FIG. 3), as will now be described.

Specifically, the example dampening mechanism 50 includes two torsion springs 60,60' (both shown in FIG. 4), although it will be appreciated that any known or suitable alternative number, type and/or configuration of biasing elements (not shown) could be employed, without departing from the scope of the disclosed concept. As shown in FIG. 4, each of the torsion springs 60,60' includes a plurality of coils 90,90' and first and second legs 92,92' and 94,94' extending outwardly from the coils 90,90'. The first legs 92,92' engage the base 66 of the mounting bracket 52, and the second legs 94,94' engage the pivot stop 80 of the pivot member 54 as shown, for example, in FIG. 3. Thus, the torsion springs 60,60' (both shown in FIG. 4) bias the pivot stop 80 within the first and second slots 86,88, thereby biasing the pivot member 54 toward the first position (FIG. 1; also shown in phantom line drawing in FIG. 3). The aforementioned pivot pin 72 preferably extends through the coils 90,90' of the torsion springs 60,60', as shown.

Continuing to refer to FIGS. 3 and 4, it will be appreciated that the first end 56 of the example pivot member 54 is a generally U-shaped bracket 96, which includes a planar portion 98, a first tab 100 extending outwardly from the planar portion 98, and a second tab 102 extending outwardly from the planar portion 98 opposite the first tab 100. When the dampening mechanism 50 is assembled, as shown in FIG. 3, the first tab 100 is disposed adjacent to the first sidewall 68 of the mounting bracket 52 and the second tab 102 is disposed adjacent to the second sidewall 70. Thus, the pivot pin 72 extends through the first sidewall 68, the first tab 100, the second tab 102 and the second sidewall 70, thereby pivotably coupling the generally U-shaped bracket to the mounting bracket 52.

The pivot member 54 further includes a intermediate portion 104 and a number of fasteners 106,108, which fasten the intermediate portion 104 to the planar portion 98 of the generally U-shaped bracket 96. The intermediate portion 104 of the example pivot member 54 is a hydraulic cylinder 104, and the aforementioned damper is a plunger 64 extending outwardly from the hydraulic cylinder 104 at or about the second end 58 thereof. The plunger 64 is movable in the direction generally indicated by arrow 110 of FIG. 4, between an extended position (FIGS. 1 and 4) and a retracted position (FIG. 3), in order to provide a predetermined dampening force on the switchgear enclosure 30 and, in particular, on the underside 46 of the ledge 44 thereof, as shown in FIG. 2. More specifically, in operation, as the circuit breaker 2 is moved toward the installed position of FIG. 2, the pivot member 54 of the dampening mechanism 50 engages at least one of the back panel 32 and the ledge 44 of the corresponding switchgear enclosure cell 42 causing the pivot member 54 to pivot (e.g., counterclockwise with respect to FIGS. 1-4) from the first position (FIG. 1; also shown in phantom line drawing in FIG. 3) to the second position (FIG. 2; also shown in solid line drawing in FIG. 3). In the non-limiting example shown and described herein, such pivotal motion of the pivot member 54 results from the plunger 64 of the pivot member 54 engaging the ledge 44 of the switchgear enclosure 30 as the circuit breaker 2 is installed, such that the dampening mechanism 50 is self-adjusting to achieve the desired relationship between the circuit breaker 2 and the corresponding switchgear enclosure cell 42. In any event, once the pivot member 54 is disposed in the second position of FIG. 2, the plunger 64 is biased against the underside 46 of the ledge 44 to provide the predetermined dampening force thereto.

It will be appreciated that the dampening force applied by the plunger 64 can be adjusted in a variety of suitable manners to advantageously control (e.g., without limitation, resist; dampen) impulse type vertical motion of the circuit breaker 2 resulting, for example, from short circuits or other fault conditions. For example, a viscous dampening force is provided by hydraulic fluid (not shown) contained within the hydraulic cylinder 104, which acts upon the plunger 64 as it is depressed (e.g., retracted). Alternatively, or in addition, the hydraulic cylinder or other suitable intermediate portion 104 of the pivot member 54 can optionally include an internal spring 112, as shown in hidden line drawing in FIG. 3, and/or an external spring 114, as shown in phantom line drawing in FIG. 4. Thus, the predetermined dampening force can be provided such that it is proportional to the velocity of the plunger 64 as it is depressed in the direction of arrow 110 of FIG. 4. Preferably, further adjustment of the hydraulic cylinder 104 can be made by adjusting the fasteners 106,108, which couple the hydraulic cylinder 104 to the planar portion 98 of the generally U-shaped bracket 96. For example and without limitation, the example hydraulic cylinder 104 is secured to the planar portion 98 by a pair of nuts 106,108 disposed on opposing sides of the planar portion 98 of the generally U-shaped bracket 96, as shown. The nuts 106,108 are adjustable (e.g., loosened; tightened) to further adjust (e.g., without limitation, move the position of the second end 58 of the pivot member 54 and plunger 64 thereof upward or downward (e.g., from the perspective of FIGS. 3 and 4); adjusting the compression of internal spring 112 (shown in hidden line drawing in FIG. 3) and/or external spring 114 (shown in phantom line drawing in FIG. 4); controlling the hydraulic force applied to the plunger 64).

Accordingly, the disclosed dampening mechanism 50 effectively and efficiently resists (e.g., without limitation, dampens) undesired movement (e.g., without limitation, vertical motion) of the circuit breaker 2 with respect to the switchgear enclosure 30. The dampening mechanism 50 can also advantageously be adapted (e.g., adjusted) to provide any known or suitable predetermined dampening force in a wide variety of electrical switching apparatus applications.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A dampening mechanism for an electrical switching apparatus which is movable into and out of an installed position within a switchgear enclosure, said switchgear enclosure including a back panel and a ledge extending outwardly from the back panel, said dampening mechanism comprising:
   a mounting bracket structured to be coupled to said electrical switching apparatus;
   a pivot member comprising a first end pivotably coupled to said mounting bracket and a second end disposed opposite and distal from the first end, said pivot member being structured to pivot between a first position corresponding to said electrical switching apparatus not being fully installed within said switchgear enclosure, and a second position corresponding to said electrical switching apparatus being disposed in said installed position;
   at least one biasing element structured to bias said pivot member toward said first position; and
   a damper movably coupled to said pivot member,
   wherein, when said electrical switching apparatus is moved toward said installed position, the second end of said pivot member is structured to engage at least one of the back panel and the ledge of said switchgear enclosure, thereby pivoting said pivot member toward said second position, and
   wherein, when said pivot member is disposed in said second position, said damper is structured to be biased against the ledge of said switchgear enclosure to dampen undesired vertical motion of said electrical switching apparatus with respect to said switchgear enclosure.

2. The dampening mechanism of claim 1 wherein said mounting bracket includes a base, a first sidewall extending outwardly from the base, and a second sidewall extending outwardly from the base opposite the first sidewall; wherein the first end of said pivot member is disposed between the first sidewall and the second sidewall; wherein said pivot member further comprises a pivot pin; and wherein said pivot pin extends through the first end of said pivot member between the first sidewall and the second sidewall.

3. The dampening mechanism of claim 2 wherein said pivot member further comprises a pivot stop; wherein said pivot stop includes a first end and a second end disposed opposite and distal from the first end of said pivot stop; wherein the first sidewall of said mounting bracket includes a first slot; wherein the second sidewall of said mounting bracket includes a second slot; wherein said pivot stop extends through the first end of said pivot member; wherein the first end of said pivot stop is disposed in said first slot; and wherein the second end of said pivot stop is disposed in said second slot.

4. The dampening mechanism of claim 3 wherein said at least one biasing element is at least one torsion spring; wherein said at least one torsion spring comprises a plurality of coils; and wherein said pivot pin extends through said coils.

5. The dampening mechanism of claim 4 wherein said at least one torsion spring further comprises a first leg and a second leg; wherein each of the first leg and the second leg extends outwardly from said coils; wherein the first leg engages the base of said mounting bracket; wherein the second leg engages the pivot stop of said pivot member; and wherein said at least one torsion spring biases said pivot stop within said first slot and said second slot, thereby biasing said pivot member toward said first position.

6. The dampening mechanism of claim 2 wherein the first end of said pivot member comprises a generally U-shaped bracket; wherein said generally U-shaped bracket includes a planar portion, a first tab extending outwardly from the planar portion, and a second tab extending outwardly from the planar portion opposite the first tab; wherein the first tab is disposed adjacent to the first sidewall of said mounting bracket; wherein the second tab is disposed adjacent to the second sidewall of said mounting bracket; and wherein said pivot pin extends through the first sidewall, the first tab, the second tab and the second sidewall, thereby pivotably coupling said generally U-shaped bracket to said mounting bracket.

7. The dampening mechanism of claim 6 wherein said pivot member further comprises an intermediate portion and a number of fasteners; wherein the intermediate portion extends between the first end of said pivot member and the second end of said pivot member; and wherein said fasteners fasten the intermediate portion to the planar portion of said generally U-shaped bracket.

8. The dampening mechanism of claim 7 wherein said damper is a plunger; wherein said plunger extends outwardly from the intermediate portion of said pivot member at or about the second end of said pivot member; wherein said plunger is movable between an extended position and a retracted position; and wherein said plunger is structured to be biased toward said extended position, in order to provide a predetermined dampening force on said switchgear enclosure.

9. The dampening mechanism of claim 8 wherein the intermediate portion of said pivot member is a hydraulic cylinder; and wherein said plunger is movable among said extended position and said retracted position with respect to said hydraulic cylinder to provide said predetermined dampening force.

10. The dampening mechanism of claim 9 wherein said hydraulic cylinder comprises at least one of an internal spring and an external spring; and wherein said at least one of an internal spring and an external spring bias said plunger toward said extended position.

11. The dampening mechanism of claim 8 wherein said fasteners are adjustable to adjust said hydraulic cylinder with respect to the planar portion of said U-shaped bracket, thereby adjusting said predetermined dampening force.

12. A draw-out electrical switching apparatus which is movable into and out of an installed position within a switchgear enclosure, said switchgear enclosure comprising a back panel and a ledge extending outwardly from the back panel, said draw-out electrical switching apparatus comprising:
   a housing;
   separable contacts;
   an operating mechanism structured to open and close said separable contacts; and
   at least one dampening mechanism comprising:
      a mounting bracket structured to be coupled to said electrical switching apparatus,
      a pivot member comprising a first end pivotably coupled to said mounting bracket and a second end disposed opposite and distal from the first end, said pivot member being structured to pivot between a first position corresponding to said electrical switching apparatus not being fully installed within said switchgear enclosure, and a second position corresponding to said electrical switching apparatus being disposed in said installed position, at least one biasing element biasing said pivot member toward said first position, and a damper movably coupled to said pivot member, wherein, when said electrical switching apparatus is moved toward said installed position, the second end of said pivot member is structured to engage at least one of the back panel and the ledge of said switchgear enclosure, thereby pivoting said pivot member toward said second position, and wherein, when said pivot member is disposed in said second position, said damper is structured to be biased against the ledge of said switchgear enclosure to dampen undesired vertical motion of said electrical switching apparatus with respect to said switchgear enclosure.

13. The draw-out electrical switching apparatus of claim 12 wherein said mounting bracket of said at least one dampening mechanism includes a base, a first sidewall extending outwardly from the base, and a second sidewall extending outwardly from the base opposite the first sidewall; wherein the first end of said pivot member of said at least one dampening mechanism is disposed between the first sidewall and the second sidewall; wherein said pivot member further comprises a pivot pin; and wherein said pivot pin extends through the first end of said pivot member between the first sidewall and the second sidewall.

14. The draw-out electrical switching apparatus of claim 13 wherein said pivot member further comprises a pivot stop; wherein said pivot stop includes a first end and a second end disposed opposite and distal from the first end of said pivot stop; wherein the first sidewall of said mounting bracket includes a first slot; wherein the second sidewall of said mounting bracket includes a second slot; wherein said pivot stop extends through the first end of said pivot member; wherein the first end of said pivot stop is disposed in said first slot; and wherein the second end of said pivot stop is disposed in said second slot.

15. The draw-out electrical switching apparatus of claim 14 wherein said at least one biasing element of said at least one dampening mechanism is at least one torsion spring; wherein said at least one torsion spring comprises a plurality of coils, a first leg extending outwardly from said coils and a second leg extending outwardly from said coils; wherein said pivot pin extends through said coils; wherein the first leg engages the base of said mounting bracket; wherein the second leg engages the pivot stop of said pivot member; and wherein said at least one torsion spring biases said pivot stop within said first slot and said second slot, thereby biasing said pivot member toward said first position.

16. The draw-out electrical switching apparatus of claim 13 wherein the first end of said pivot member of said at least one dampening mechanism comprises a generally U-shaped bracket; wherein said generally U-shaped bracket includes a planar portion, a first tab extending outwardly from the planar portion, and a second tab extending outwardly from the planar portion opposite the first tab; wherein the first tab is disposed adjacent to the first sidewall of said mounting bracket; wherein the second tab is disposed adjacent to the second sidewall of said mounting bracket; and wherein said pivot pin extends through the first sidewall, the first tab, the second tab and the second sidewall, thereby pivotably coupling said generally U-shaped bracket to said mounting bracket.

17. The draw-out electrical switching apparatus of claim 16 wherein said pivot member of said at least one dampening mechanism further comprises an intermediate portion and a number of fasteners; wherein the intermediate portion extends between the first end of said pivot member and the second end of said pivot member; wherein said fasteners fasten the intermediate portion to the planar portion of said generally U-shaped bracket; wherein said damper of said at least one dampening mechanism is a plunger; wherein said plunger extends outwardly from the intermediate portion of said pivot member at or about the second end of said pivot member; wherein said plunger is movable between an extended position and a retracted position; and wherein said plunger is structured to be biased toward said extended position, in order to provide a predetermined dampening force on said switchgear enclosure.

18. The draw-out electrical switching apparatus of claim 17 wherein the intermediate portion of said pivot member is a hydraulic cylinder; and wherein said plunger is movable among said extended position and said retracted position with respect to said hydraulic cylinder to provide said predetermined dampening force.

19. The draw-out electrical switching apparatus of claim 18 wherein said fasteners of said pivot member are adjustable to adjust said hydraulic cylinder with respect to the planar portion of said U-shaped bracket, thereby adjusting said predetermined dampening force.

20. The draw-out electrical switching apparatus of claim 12 wherein said switchgear enclosure further comprises a plurality of walls extending outwardly from the back panel to form a cell; wherein said draw-out electrical switching apparatus is structured to be disposed in said installed position within said cell; wherein said housing of said draw-out circuit breaker includes a first side, a second side, and a draw-out mechanism; wherein said draw-out mechanism comprises a first rail disposed on the first side of said housing, and a second rail disposed on the second side of said housing; and wherein each of said at least one dampening mechanism is coupled to a corresponding one of said first rail and said second rail.

* * * * *